S. HINDS.
PUMP INCLOSING CASING.
APPLICATION FILED JULY 9, 1917.
1,274,039.
Patented July 30, 1918.
2 SHEETS—SHEET 2.
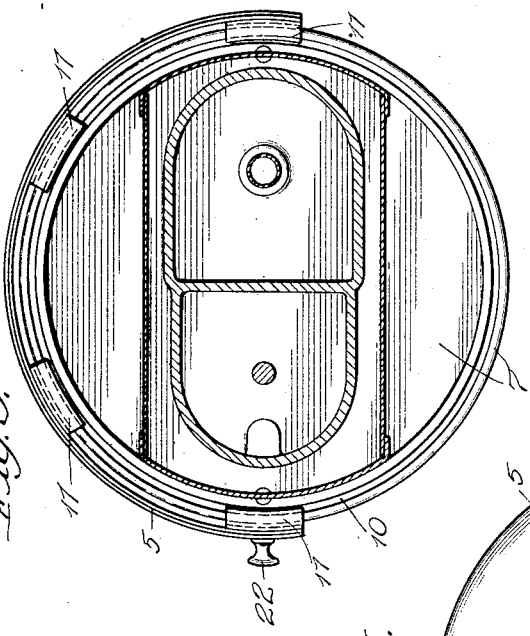
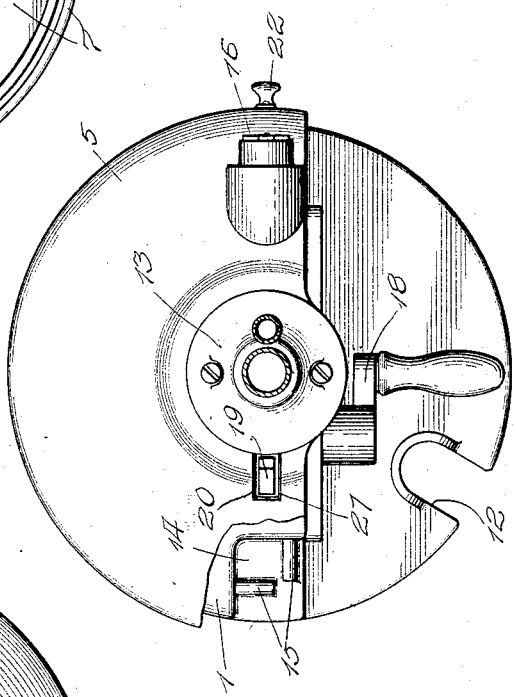
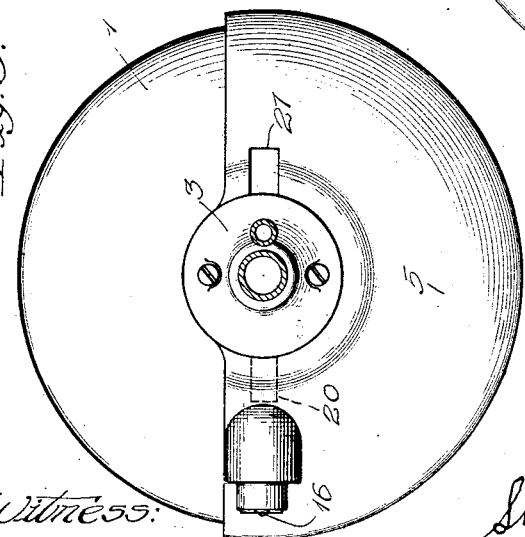

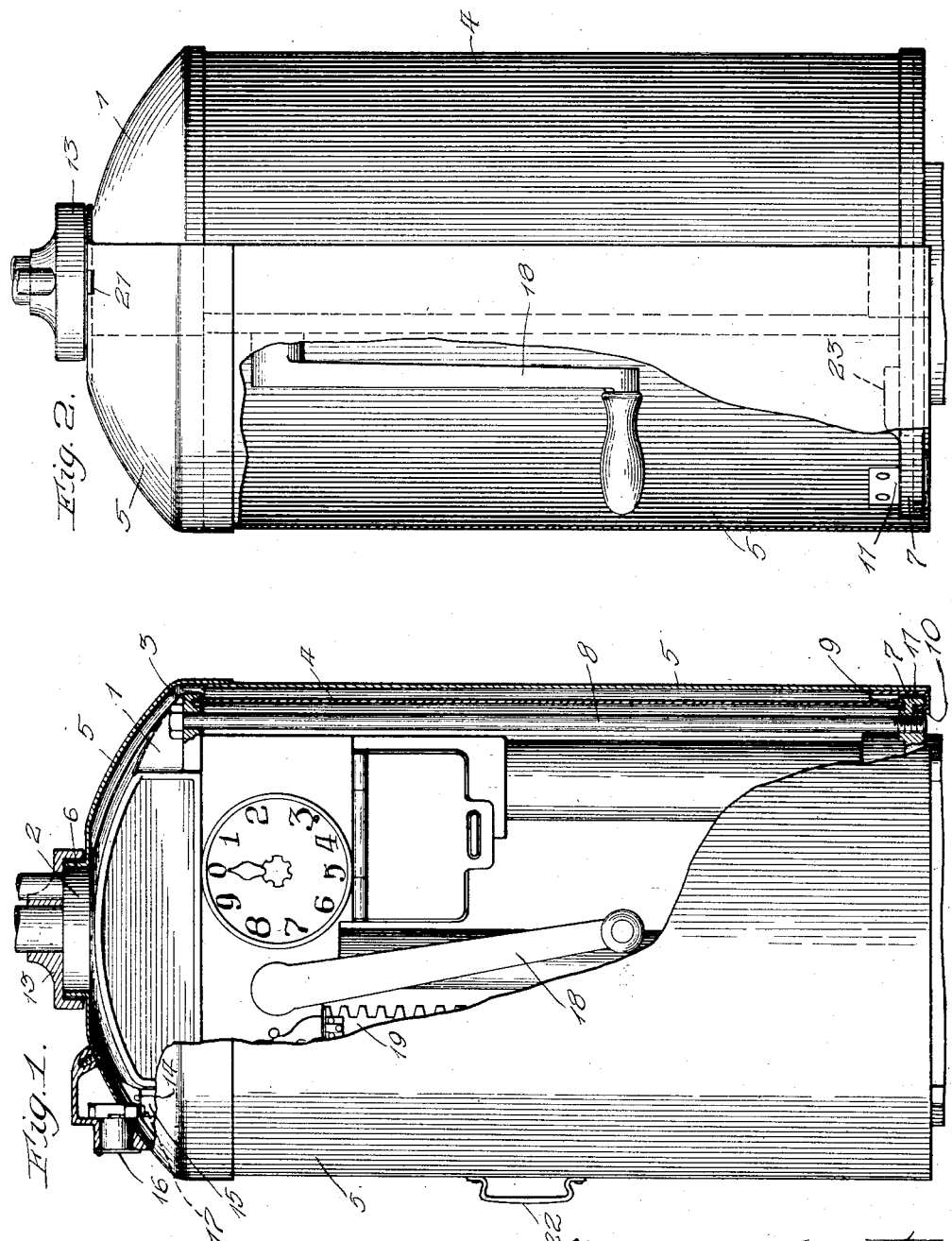

UNITED STATES PATENT OFFICE.

SHERWOOD HINDS, OF FORT WAYNE, INDIANA.

PUMP-INCLOSING CASING.

1,274,039.  Specification of Letters Patent.  Patented July 30, 1918.

Application filed July 9, 1917. Serial No. 179,546.

*To all whom it may concern:*

Be it known that I, SHERWOOD HINDS, a citizen of the United States, residing at Fort Wayne, in the county of Allen and State of Indiana, have invented certain new and useful Improvements in Pump-Inclosing Casings, of which the following is a specification.

This invention relates to a casing for protecting some operative mechanism from the weather when the casing is closed, and although it is more particularly designed and intended for use in connection with a liquid dispensing pump, it may have a more general application to any operative mechanism which it is desirable to inclose.

The invention consists in the novel construction, combination and arrangement of parts.

In the accompanying drawings—

Figure 1 is a front elevation with a portion of the casing broken away showing a casing constructed in accordance with the principles of this invention.

Fig. 2 is a side elevation with a portion of the casing broken away.

Fig. 3 is a top view of the casing when it is closed.

Fig. 4 is a corresponding view when the casing is open; and

Fig. 5 is a sectional view taken from below the base plate of the casing to show the engagement of the movable portion of the casing therewith.

Although there are many forms of casing for protecting dispensing apparatus from the weather, the present invention relates to one in which the casing is made in segments, each embracing slightly more than a semi-circle, with one part rotatable upon the other so that the sections overlap when the casing is closed, and one section substantially covers the other when the casing is open, thereby freeing the mechanism for operation so that the parts are easily accessible when the casing is open.

This construction is particularly adapted for use with liquid dispensing apparatus, such as an oil pump, for the reason that in supplying automobiles, and the like, with gasolene or oil, it is desirable to have the pump at the curb or adjacent a roadway where it is not convenient or desirable to have a small house, or the like, and for the further reason that such an inclosure is frequently prohibited by fire and other city ordinances. In such a construction it is also desirable to have the casing as compact as possible, and the operating crank of a pump usually embraces a circle for operation which is not within the confines of the casing and, therefore, the casing must be free from the crank to facilitate its operation. Pumps of the type usually employed embrace a reciprocable rack which must pass upwardly beyond the height of the casing required for merely housing the rack in its lowermost position and, therefore, the present construction is particularly adapted for use with pumps of this type.

In the accompanying drawings there are fixed and movable casing parts, the former comprising a top member 1 formed with a collar 2 at the top and having a groove 3 in its outer edge in which a casing member 4 is seated, both the casing member and the top member embracing slightly more than a semi-circle, and the collar 2 being circular in form. Rotatable upon the top member 1 is the movable casing member 5 which has a flange 6 extending upwardly about the collar 2, and this movable section also embraces substantially the same portion of a circle as embraced by the fixed casing section so that when closed the casing sections overlap, but when the movable section is rotated it substantially covers and incloses the fixed casing section.

At the bottom of the sections is a common circular base 7 which is connected to the top member 1 by rods 8. In the upper edge of the base is a groove 9 for seating the lower edge of the fixed casing member 4, and in the bottom of the base adjacent the edge is a groove 10 for engaging the guiding clips 11 which are attached to the bottom of the movable casing part 5 for holding this part in place. The base 7 is circular in form, and in the edge thereof is a notch 12 through which any member, as for example a hose, attached at one end within the casing may extend through the bottom of the casing when it is closed and may be removed from the notch when the casing is open. At the top of the sections and secured to the fixed one is a cap 13 which has a flange extending downwardly over the upright edge 6 of the movable section 5, preventing objectionable material from passing downwardly between the member 5 and the collar 2. At one of the edges of the top member 1 is a depression 14, as shown in Fig. 4, with locking ridges 15 extending upwardly therefrom. Secured in the top of the movable section 5 is a lock 16 which has a latch 17 adapted to be moved to engage behind the ridges 15 for locking the movable portion of the casing in closed position.

Within the casing is the operating mechanism which is inclosed thereby, in the present exemplification, including an operating crank 18 which is of such a length that when it is rotated the handle thereof extends without the space that is included by the movable portion of the casing when it is closed; in other words, the movable portion of the casing must be entirely clear of the crank in order to permit of its rotation. The operating mechanism of a pump to which this invention is applied embraces also a reciprocable rack member 19 which when the pump, not shown, is at the lowermost end of its stroke is entirely covered by the casing sections, but in its raised position, the member 19 may extend some distance above the top of the casing sections. For the accommodation of this reciprocating member the top member 1 is formed with a perforation 20, and the movable casing section 5 is formed with a perforation 21 which registers with the other perforations when the rotatable casing is entirely open. In this position, as shown by Fig. 4, the rack 19 may be reciprocated freely, and when the casing is closed, the openings will also be closed as they will not register them. It is obvious that this construction permits a casing to be used which is of much less height than one which would inclose the reciprocable member 19 in either its raised or lowered position. This, therefore, tends to reduce the size of the casing and make it more compact for accomplishing the desired result. A handle 22 is provided at one side of the casing member 5 to facilitate its rotation.

In operation it is necessary only to unlock the casing section 5, rotate it about the other section so that the openings 20 and 21 through the two sections register. For this purpose a stop 23 is provided on the base member 7 to engage the casing member 5 and prevent its further rotation in one direction. This will then uncover the crank 18 so that it can be freely rotated for operating the mechanism inclosed by the casing reciprocating the rack 19, or any other operating member as previously set forth. When it is desired to close the casing the rack is operated to its lowermost position, and at this time the crank 18 will be substantially in a vertical position, as shown by Fig. 1, in which it will be inclosed by the movable section 5 of the casing.

I claim:—

1. An inclosing casing comprising relatively fixed and movable segmental parts vertically divided and one rotatable about the other and overlapping it when closed both at the edges of the top and of the sides.

2. An inclosing casing comprising a fixed top member and a base with a casing portion extending between the two and embracing a segment of more than half a circle, and a rotatable casing part overlapping the edges of the fixed casing part when closed and covering the top member and the other casing member when open.

3. An inclosing casing comprising a segmental structure embracing slightly more than a semi-circle, and a part rotatable thereon embracing the same segmental portion but overlapping the top and edges of the fixed portion when the movable part of the casing is closed.

4. The combination with a casing having a fixed segmental portion and a rotatable segmental portion movable to cover the fixed portion, and operating mechanism to which the fixed casing portion is secured comprising a manually rotatable crank uncovered by the movable portion of the casing and movable beyond the outlines of the said movable portion when it covers the fixed portion.

5. The combination with an inclosing casing comprising a fixed section and a covering section rotatable thereon, both embracing slightly more than a semi-circle in cross-section and each of the sections being formed with perforations in the overlapping edges thereof which register when the movable portion is entirely open, and operating means attached to the fixed casing section within the casing comprising a rack which is movable through the perforations of the casing when they register.

6. An inclosing casing comprising relatively fixed and movable segmental parts vertically divided and one rotatable about the other and overlapping it when closed both at the edges of the top and of the sides, and means between the parts for connecting the overlapping edges for holding the movable portion in the closed position.

7. The combination with an inclosing casing comprising a fixed and a movable segment, each embracing more than a semi-circle and having perforations which register when the movable portion is rotated to cover the fixed portion, of mechanism attached to the fixed casing segment and uncovered for manual operation only when the movable portion entirely covers the fixed portion of the casing and comprising an operating member movable beyond the outlines of the movable portion of the casing when it is closed, and an operated element raised by the operation of the member above the height of the casing parts.

8. The combination with an inclosing casing comprising a fixed section and a movable section rotatable to cover the fixed section, the edges of the movable section overlapping the edges of the fixed section when the casing is closed by the two casing portions having perforations in the top which register when the movable section of the casing entirely covers the fixed section, and mechanism attached to the fixed section within the casing manually operable from without only when it is open and comprising a member movable upwardly through the registering perforations in the casing.

9. An inclosing casing comprising relatively fixed and movable segmental parts vertically divided and one rotatable about the other and overlapping it when closed both at the edges of the top and of the sides, and means between the overlapping edges of the top portions of the casing parts for holding the parts together in closed position.

10. In an inclosing casing, a top member embracing more than a semi-circle, a circular base plate, a casing member connected between the top and the base plate at the corresponding edges thereof, and a movable casing member supported upon the top member and extending below the said base member and rotatable to cover the top member and the other casing member to open the casing.

11. An inclosing casing comprising a fixed section and a movable section, each embracing more than a semi-circle, and a common circular base plate for the two sections, the movable section being rotatable to cover the fixed section and having engaging means which extends below the base plate for guiding it.

12. In an inclosing casing, a fixed section having a top member with an upright collar and a movable section rotatable upon the top member having an upright edge around said collar, and a cap extending over the collar and said edge to prevent the admission of dirt and moisture therebetween.

13. In an inclosing casing, the combination with a fixed section and a movable section, each embracing more than a semi-circle and the movable section being rotatable about the other section, of a common base plate for the two sections having a groove on the underside adjacent its periphery, and guiding means secured to the lower edge of the movable section extending into the groove of the base member.

14. In an inclosing casing for pumps, a fixed section and a movable section, each embracing more than a semi-circle, the movable section being rotatable to cover the fixed section to open the casing, and a common base plate for the two sections to which the fixed section is secured having a notch in its periphery through which a member may extend when the casing is open or closed and from which such a member may be disengaged when the movable portion of the casing is rotated to uncover the said notch.

15. The combination with an inclosing casing comprising a fixed section and a movable section rotatable to cover the fixed section, the edges of the movable section overlapping the edges of the fixed section when the casing is closed and the two casing portions having perforations in the top which register when the movable section of the casing entirely covers the fixed section.

In testimony whereof I have signed my name to this specification, on this 25th day of June A. D. 1917.

SHERWOOD HINDS.

Witnesses:
J. R. MATLACK,
C. A. WERKMAN.

Copies of this patent may be obtained for five cents each, by addressing the "Commissioner of Patents, Washington, D. C."